United States Patent
Tickoo et al.

(10) Patent No.: US 12,209,882 B2
(45) Date of Patent: Jan. 28, 2025

(54) MAP REPRESENTATION SYSTEM AND METHOD FOR OPERATING AN AUTONOMOUS AGENT

(71) Applicant: Intel Corporation, Santa Clara, CA (US)

(72) Inventors: Omesh Tickoo, Portland, OR (US); Rajesh Poornachandran, Portland, OR (US); David Israel González Aguirre, Hillsboro, OR (US); John Charles Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 17/126,072

(22) Filed: Dec. 18, 2020

(65) Prior Publication Data

US 2021/0140793 A1    May 13, 2021

(51) Int. Cl.
*G01C 21/00* (2006.01)
*G05D 1/00* (2024.01)

(52) U.S. Cl.
CPC ....... *G01C 21/3889* (2020.08); *G05D 1/0088* (2013.01); *G05D 1/0212* (2013.01)

(58) Field of Classification Search
None
See application file for complete search history.

(56) References Cited

U.S. PATENT DOCUMENTS

| | | | | |
|---|---|---|---|---|
| 2003/0001865 A1* | 1/2003 | Hirose | ........... | G06F 3/0485 345/619 |
| 2008/0109098 A1* | 5/2008 | Moshier | ........... | G06Q 10/06 700/103 |
| 2011/0216185 A1* | 9/2011 | Laws | ........... | H04N 7/18 348/121 |
| 2014/0306866 A1* | 10/2014 | Miller | ........... | G06T 1/20 345/8 |
| 2016/0026253 A1* | 1/2016 | Bradski | ........... | H04N 13/128 345/8 |
| 2018/0222051 A1* | 8/2018 | Vu | ........... | B25J 9/1697 |
| 2019/0094981 A1* | 3/2019 | Bradski | ........... | H04N 21/414 |
| 2019/0187703 A1 | 6/2019 | Millard et al. | | |
| 2021/0279953 A1* | 9/2021 | Bouhnik | ........... | G06T 17/05 |

(Continued)

FOREIGN PATENT DOCUMENTS

KR    20200034529 A    3/2020

OTHER PUBLICATIONS

European Search Report issued for the corresponding European Application No. EP 21 19 4493.9, dated Mar. 21, 2022, 10 pages (for informational purposes only).

*Primary Examiner* — Hunter B Lonsberry
*Assistant Examiner* — Robert L Pinkerton
(74) *Attorney, Agent, or Firm* — Viering, Jentschura & Partner mbB

(57) ABSTRACT

Various aspects are related to a map representation system including one or more processors configured to: obtain operation task data, the operation task data indicating one or more operation tasks associated with an operation of one or more autonomous agents within a corresponding operating space; and obtain operation task specific map data as a function of the operation task data, the operation task specific map data representing the operating space corresponding to the one or more operation tasks.

22 Claims, 6 Drawing Sheets

(56) References Cited

U.S. PATENT DOCUMENTS

2021/0341940 A1\* 11/2021 Baik ................... G01C 21/3878
2021/0349470 A1\* 11/2021 McDaniel ............ G05D 1/0276
2022/0088787 A1\* 3/2022 Vu ......................... B25J 9/1676

\* cited by examiner

MAP REPRESENTATION SYSTEM AND METHOD FOR OPERATING AN AUTONOMOUS AGENT

TECHNICAL FIELD

Various aspects relate generally to a representation system, e.g., a map representation system, and a method for operating an autonomous agent.

BACKGROUND

In general, an autonomous agent may include hardware and/or software based entities that may respond to states and events in their environment at least partially independent from direct instruction by a user. The configurations of an autonomous agent may include aspects related to actions that are performed on behalf and in the interest of the user. In some applications, an autonomous agent may perform various tasks, e.g., navigation tasks, interaction tasks, as examples. Therefore, a map may be utilized that allows the autonomous agent to perform the desired one or more tasks. A map may be the basis for generating a virtual representative of a real space. A map may be related to one specific type of representation, e.g., a voxel map is related to a voxel representation.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

An autonomous agent and/or a group of autonomous agents may be configured to carry out one or more actions in a task specific manner. An autonomous agent may include or may be a robot (e.g., a robot fixed to a base or a mobile robot). An autonomous agent may include or may be an autonomous vehicle (e.g., a robotaxi, a drone, an autonomous aircraft, an autonomous vessel, an autonomous boat, an autonomous submarine, only as examples). One or more actions that an autonomous agent and/or a group of autonomous agents may carry out in a task specific manner may include or may be: navigating, interacting, handling, passing, (e.g., jointly) working, (e.g., jointly) processing, (e.g., jointly) manipulating (e.g., actions of one or more collaborative agents), controlling (e.g. actions of one or more actuators), driving, flying, only as examples. Various aspects are related to an efficient (e.g., intelligent) data storage and/or data retrieval system for handling one or more virtual representations (also referred to as maps) of space, environment, objects and/or behavior of objects in the real world in a task specific manner. In some aspects, a hierarchical and/or semantic data storage may allow for an efficient data access/transfer and/or processing of representation kernels based on a task or context of a task. As an example: provide a first virtual representation for a first task (e.g., for a manipulation task) and a second virtual representation for a second task (e.g., for a navigation task), the first virtual representation and the second virtual representation may have distinct granularities or levels of detail. Object granularity/level of detail might include texture resolution, point cloud resolution, behavior resolution. Also, for the very same task, it might be beneficial to have different virtual representations with different granularities or levels of detail, e.g. a task being carried out with systems of different capabilities, e.g. processing power.

Figure 1:
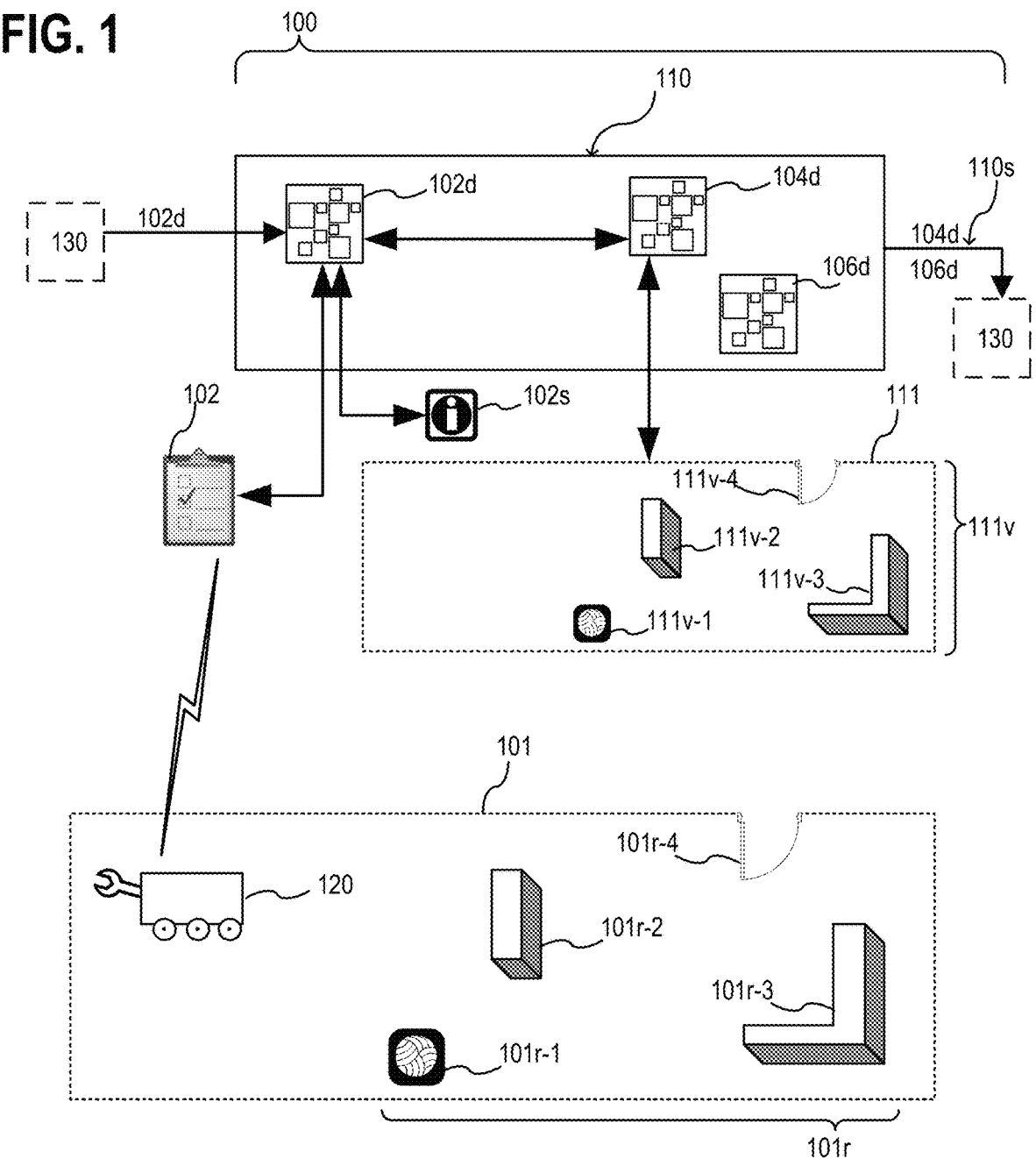
FIG. 1 shows an exemplary map representation system and components thereof in a schematic view, according to some aspects.

FIG. 1 illustrates a map representation system 100 (also referred to as map system or representation system) in a schematic view, according to various aspects. The map representation system 100 may include one or more processors 110. The one or more processors 110 may be configured to obtain operation task data 102d. The operation task data 102d may indicate (e.g., may represent) one or more operation tasks 102 associated with an operation of one or more autonomous agents 120 within a corresponding operating space 101. The one or more processors 110 may be configured to obtain operation task specific map data 104d as a function of the operation task data 102d. The operation task specific map data 104d may indicate (e.g., may represent) a two-dimensional or three-dimensional representation 111 of the operating space 101 corresponding to the one or more operation tasks 102.

According to various aspects, a two-dimensional or three-dimensional representation 111 of the operating space 101 may include a virtual representation 111v (e.g., a two-dimensional or three-dimensional virtual representation 111v) of one or more objects 101r disposed in the real world, e.g., disposed in the operating space 101. In some aspects, operation task specific map data 104d may include position and/or dimension information associated with one or more objects 101r in the real world that are relevant for a specific task, e.g., one or more relevant objects 101r disposed in the operating space 101. In some aspects, operation task specific map data 104d may include position and/or dimension information associated with one or more objects 101r disposed in a region of interest within the operating space 101, e.g., disposed in one or more regions of the operating space 101 that are relevant for a specific task. In some aspects, the operating space 101 may be the space that can be accessed by the one or more autonomous agents 120, e.g., a room, a building, an outdoor area, as examples.

In some aspects, the operation task data 102d and/or the one or more operation tasks 102 may further indicate a demand for semantic information 102s associated with the operation of the one or more autonomous agents 120 within the operating space 101. According to various aspects, the one or more processors 110 may be further configured to obtain operation task specific semantic data 106d. Operation task specific semantic data 106d may include semantic information related to one or more objects disposed in the real world that are relevant for a specific task. Semantic information may include at least one of the following information: information related to a material of one or more objects in the operating space; information related to a morphology of one or more objects in the operating space; information related to a color of one or more objects in the operating space; information related to a surface property of one or more objects in the operating space; information related to a movement function of one or more objects in the operating space; information related to an activation and/or deactivation function of one or more objects in the operating space; information related to a deformation function of one or more objects in the operating space.

According to various aspects, the one or more processors 110 may be further configured to cause to send 110s the operation task specific map data 104d and/or the operation task specific semantic data 106d, e.g., to a task planning system 130 associated with the map representation system 100.

Figure 2:
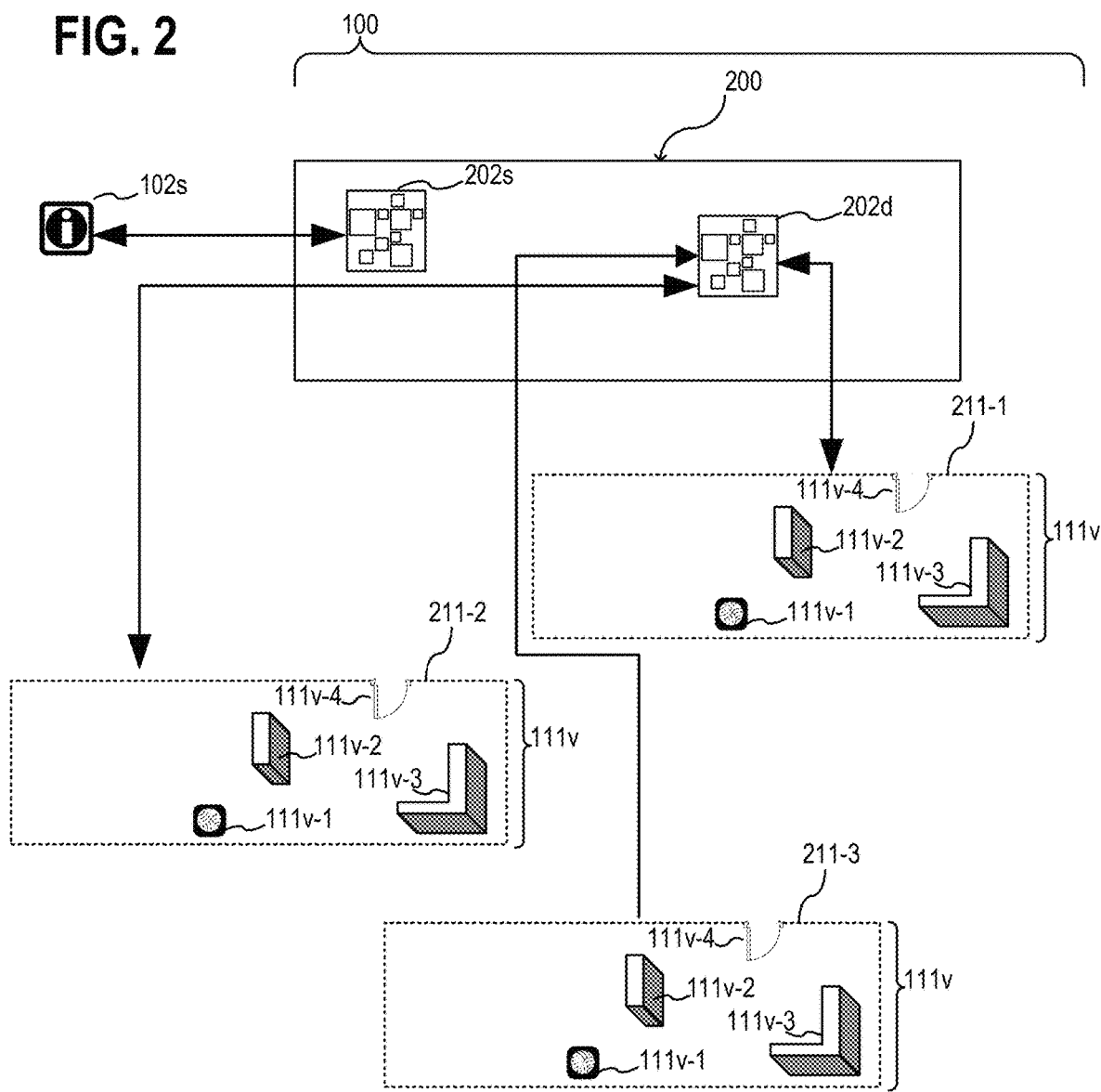
FIG. 2 shows exemplarily one or more memories associated with a map representation system and components thereof in a schematic view, according to some aspects.

According to various aspects, the map representation system 100 may further include one or more memories (see FIG. 2). The one or more memories may store map data, the map data may represent a set of distinct two-dimensional or three-dimensional representations of the operating space. According to various aspects, a two-dimensional or three-dimensional representation of an operating space 101 or a region of the operating space 101 may include all virtual representations 111v (e.g., 111v-(1, 2, 3, 4)) corresponding to one or more objects 101r (e.g., 101r-(1, 2, 3, 4)) disposed in the operating space 101 or in the region of the operating space 101. According to various aspects, a task specific two-dimensional or three-dimensional representation of an operating space 101 or a region of the operating space 101 may include the virtual representations 111v (e.g., 111v-(1, 2, 3, 4)) corresponding to one or more objects 101r (e.g., 101r-(1, 2, 3, 4)) that are relevant for the corresponding task and disposed in the operating space 101 or in the region of the operating space 101. According to various aspects, semantic data 106d may be stored in the one or more memories and associated with the map data 104d. The semantic data may represent semantic information associated with one or more objects located in the operating space 101 or in a region of the operating space 101.

According to various aspects, the one or more processors 110 may be configured to obtain the operation task data 102d by receiving the operation task data 102d from the autonomous agent planning system 130. The one or more processors 110 may be configured to obtain the operation task specific map data 104d by selecting, in accordance with the one or more operation tasks 102, the one or more two-dimensional or three-dimensional representations of the regions of the operating space from a set of distinct two-dimensional or three-dimensional representations of the operating space. The one or more processors 110 may be configured to obtain the operation task specific map data 104d by selecting, in accordance with the one or more operation tasks 102, the two-dimensional or three-dimensional representation of the operating space from a set of distinct two-dimensional or three-dimensional representations of the operating space.

According to various aspects, the one or more processors 110 may be configured to obtain the operation task specific map data 104d by selecting, in accordance with the one or more operation tasks 102, a first two-dimensional or three-dimensional representation of a first portion of the operating space 101 from a set of distinct two-dimensional or three-dimensional representations of the operating space and a second two-dimensional or three-dimensional representation of a second portion of the operating space 101 from a set of distinct two-dimensional or three-dimensional representations of the operating space 101, the first two-dimensional or three-dimensional representation and the second two-dimensional or three-dimensional representation providing the two-dimensional or three-dimensional representation of the operating space corresponding to the one or more operation tasks.

According to various aspects, the one or more processors 110 may be configured to obtain the operation task specific map data 104d by selecting, in accordance with the one or more operation tasks 102, one or more first two-dimensional or three-dimensional representations of one or more first portions of the operating space 101 from a set of distinct two-dimensional or three-dimensional representations of the operating space and one or more second two-dimensional or three-dimensional representation of one or more second portions of the operating space 101 from a set of distinct two-dimensional or three-dimensional representations of the operating space 101, the one or more first two-dimensional or three-dimensional representations and the one or more second two-dimensional or three-dimensional representation providing the two-dimensional or three-dimensional representation of the operating space corresponding to the one or more operation tasks.

According to various aspects, the one or more processors 110 may be configured to obtain the operation task specific map data 104d by selecting, in accordance with the one or more operation tasks 101, one or more first two-dimensional or three-dimensional representations of one or more first objects (e.g., two-dimensional or three-dimensional representations 111v-3, 111v-4 of the objects 101r-3, 101r-4) in the operating space 101 from a set of distinct two-dimensional or three-dimensional representations of the operating space and one or more second two-dimensional or three-dimensional representations of one or more second objects (e.g., two-dimensional or three-dimensional representations 111v-1, 111v-2 of the objects 101r-1, 101r-2) in the operating space 101 from a set of distinct two-dimensional or three-dimensional representations of the operating space, the first two-dimensional or three-dimensional representation and the second two-dimensional or three-dimensional representation providing the two-dimensional or three-dimensional representation of the operating space corresponding to the one or more operation tasks.

In some aspects, the set of distinct two-dimensional or three-dimensional representations of the operating space may include a plurality of two-dimensional or three-dimensional representations with distinct granularities. Two-dimensional or three-dimensional representations may include: a two-dimensional or three-dimensional point-cloud representation, a two-dimensional or three-dimensional voxel representation, and/or a two-dimensional surface representation.

According to various aspects, the set of distinct two-dimensional or three-dimensional representations of the operating space 101 may have a basic map associated therewith (e.g., defining common coordinates for all of the distinct two-dimensional or three-dimensional representations). The basic map may represent a coordinate system of a virtual space 111 in accordance with the operating space 101 and each two-dimensional or three-dimensional representation of the set of distinct two-dimensional or three-dimensional representations is a representation of the basic map.

According to various aspects, an operation task may include at least one of the following operation tasks: a navigation task, an obstacle avoidance task. The obstacle represents an object in the operating space, an interaction task may relate to an interaction with one or more objects in the operating space.

According to various aspects, a map representation system 100 may include one or more memories. FIG. 2 illustrates one or more memories 200, e.g., associated with the map representation system 100, in a schematic view, according to various aspects.

According to various aspects, the one or more memories 200 may store map representation data 202*d*. The map representation data 202*d* may represent a set of distinct representations 211-1, 211-2, 211-3 associated with a basic map. The map representation data 202*d* may represent an operating space 101 for operations of one or more autonomous agents 120 and associated objects 101*r* in the operating space 101, see FIG. 1. The basic map may define the coordinates of the operating space 101 and tie the distinct representations 211-1, 211-2, 211-3 thereto. Each of the representations 211-1, 211-2, 211-3 may include one or more or all objects 101*r* disposed in the operating space 101. According to various aspects, each of the representations 211-1, 211-2, 211-3 may be of a different type, e.g., one of the representations 211-1, 211-2, 211-3 may be a point cloud representation, another one of the representations 211-1, 211-2, 211-3 may be a voxel representation, and still another one of the representations 211-1, 211-2, 211-3 may be a surface representation. According to various aspects, each of the representations 211-1, 211-2, 211-3 may be of a different granularity.

According to various aspects, semantic data 202*s* may be stored in the one or more memories 200 and associated with the map representation data 202*d*. The semantic data may represent semantic information associated with one or more objects 101*r* located in the operating space 110. The semantic information may be stored with reference to a node, the node representing one or more objects 101*r* to which the semantic information are related to. The nodes may have coordinates of the basic map associated therewith.

Figure 3:
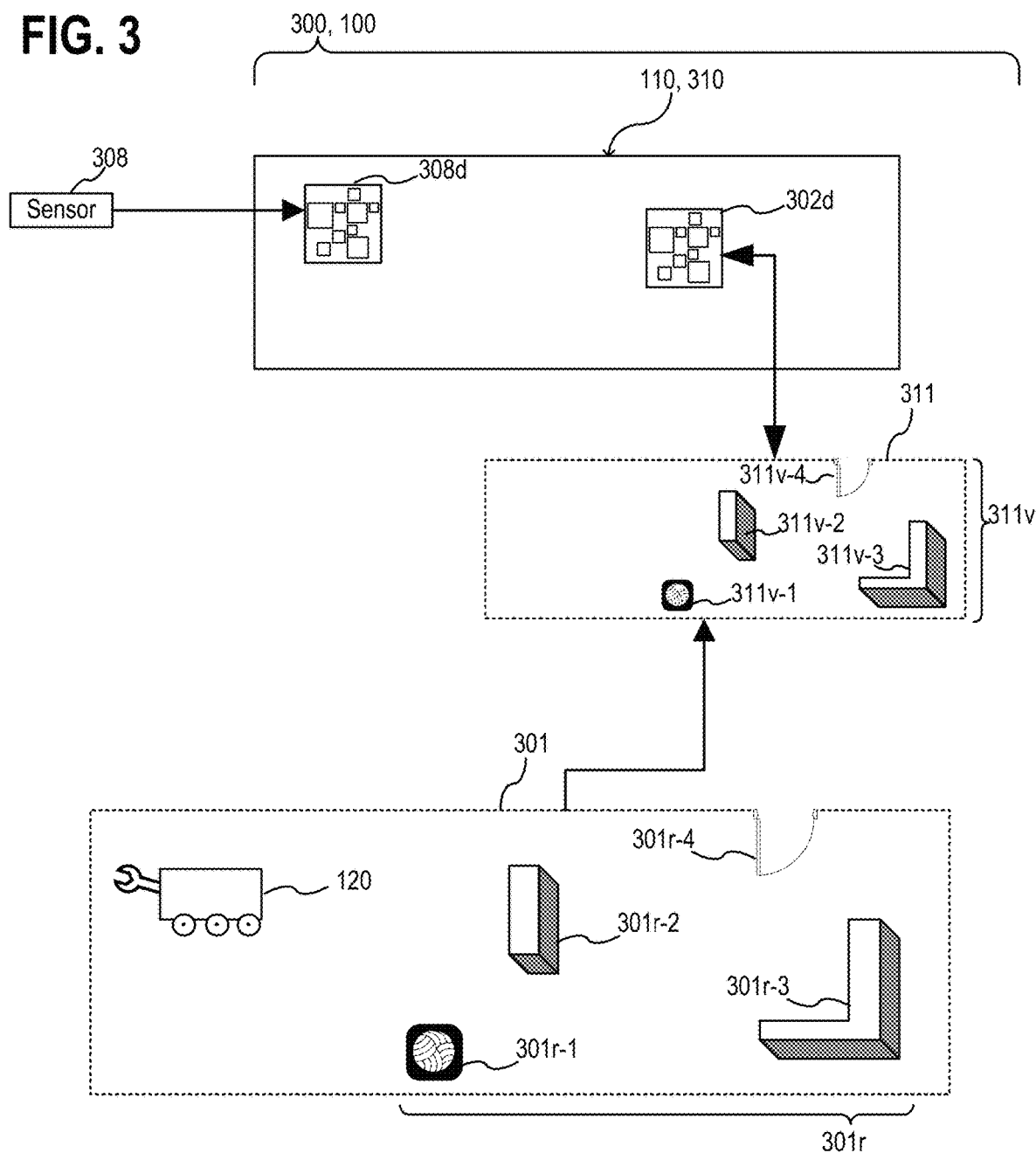
FIG. 3 shows an exemplary map representation system and components thereof in a schematic view, according to some aspects.

FIG. 3 illustrates a map representation system 300 (also referred to as map system or representation system) in a schematic view, according to various aspects. The map representation system 300 may be the map representation system 100 described herein or another map representation system.

According to various aspects, the map representation system 300 may include one or more processors 310 (in the case that the map representation system 300 is the map representation system 100, the one or more processors 110). The one or more processors 310, 110 may be configured to obtain map data 302*d*. The map data 302*d* may represent a virtual space 311 associated with a real space 301. The real space 301 may be an operating space for operating one or more autonomous agents 120. The map data 302*d* may further represent one or more first virtual representations 311*v*-1, 311*v*-2 of one or more first objects 301*r*-1, 301*r*-2 disposed within the real space 301 and one or more second virtual representations 311*v*-3, 311*v*-4 of one or more second objects 301*r*-3, 301*r*-4 disposed within the real space 301. According to various aspects, the one or more first virtual representations 311*v*-1, 311*v*-2 may be of a first type of representations and the one or more second virtual representations 311*v*-3, 311*v*-4 may be of a second type of virtual representations different from the first type of virtual representations. The virtual representations 311*v* of the objects 301*r* may relate to a basic map providing the coordinates for defining positons and/or dimensions of the virtual representations 311*v* representing positions and/or dimension of the objects 301*r* in the real space 301. The basic map may be or may define the virtual space 311.

According to various aspects, the one or more processors 310, 110 may be further configured to obtain sensor data 308*d*. The sensor data 308*d* may represent information (e.g., spatial information, e.g., information about physical properties, chemical properties, geometrical properties, as examples) associated with the real space 301 and/or the one or more objects 301*r* disposed therein. The one or more processors 310, 110 may generate the map data 302*d* based on the sensor data 308*d*.

According to various aspects, the sensor data 308*d* may represent sensor fusion information provided by a plurality of sensors 308.

According to various aspects, the basic map, e.g., the virtual space 311, may include at least two different types of virtual representations. The first type of virtual representations and the second type of virtual representations may differ from one another with respect to the granularity. In some aspects, the first type of virtual representations may be one of a point cloud representation, a voxel representation, and a surface representation, and the second type of virtual representations may be another one of a point cloud representation, a voxel representation, and a surface representation.

According to various aspects, the map data 302*d* may further represent one or more third virtual representations of one or more third objects, of the one or more first objects 301*r*-1, 301*r*-2, and/or of the one or more second objects 301*r*-3, 301*r*-4 disposed within the real space 301. The one or more third virtual representations may be of a third type of virtual representations different from the first type of virtual representations and/or different from the second type of virtual representations.

According to various aspects, the first type of virtual representations and the second type of virtual representations may differ from one another with respect to the granularity; the first type of virtual representations and the third type of virtual representations may differ from one another with respect to the granularity; and/or the second type of virtual representations and the third type of virtual representations may differ from one another with respect to the granularity.

According to various aspects, the first type of virtual representations may be one of a point cloud representation, a voxel representation, and a surface representation; the second type of virtual representations may be another one of a point cloud representation, a voxel representation, and a surface representation; and/or the third type of virtual representations may be still another one of a point cloud representation, a voxel representation, and a surface representation.

Autonomous systems, e.g., robots, may work in rather complex environments and may need to perform various planning, grasping, and/or manipulation tasks alone or in conjunction with other autonomous systems. Each of these tasks may need immediate environment understanding that may be stored as representations built through perceiving the surrounding using various sensors. Depending on the complexity of the task, the granularity of the required representation can vary from very coarse (e.g., including surface representations) to extremely fine (e.g., including point cloud representations). The storage and computation requirements may vary according to the granularity of the representation. In some aspects, being able to store and retrieve the desired representation in real time without overburdening the autonomous system may be a key to developing power efficient solutions that can be responsive in the real world deployments. Such a capability may also help to reduce the amount of environmental state data required to be communicated between servers and agents or between agents themselves for performing various collaborative tasks.

According to various aspects, scalable hierarchical representations for autonomous systems are provided. One or more aspects address the challenge of providing compute and memory efficient representations.

Agents may keep multiple formats of representations for different tasks. However, such existing solutions may suffer from compute, storage, and/or latency overheads. Having multiple formats of representations stored may concurrently lead to a higher storage space requirement and higher compute requirements for deriving the desired representations for various tasks. Further, this may translate to higher latencies in response time leading to power inefficiencies and hurdles to implement real time autonomous usages.

According to various aspects, a map representation system may include a unified and scalable space representation methodology. The map representation system (e.g., map representation system 100 or map representation system 300) may provide a hierarchical access to the representations ranging from highly granular surfaces to fine granular point clouds. The map representation system may enable representation and retrieval based on semantic requirements including shapes, operating degrees of freedom, and/or interaction attributes. The map representation system may enable intelligent data storage and retrieval through application programming interfaces for query response to efficiently process representation kernels based on context of the task.

Additionally, hierarchical representation interfaces may provide the opportunity to specify explicit Service Level Agreement (SLA) in terms of tolerable representation for one or more autonomous agent based on their dynamic sensory needs/limitations. This may also allow for collaboration between autonomous agents in a complementary way or with cross-correlation to gain improved confidence with limited resources. Based on the SLA, one or more collaborative autonomous agents may be configured to negotiate compute, communications, and storage representation of the visual cloud data.

As an example, a tolerance factor specified by the application may range from 0 to 1. This may represent tolerance to potential change in system resource and/or data representation. Factor=0, for example, may indicate that an application cannot tolerate any change in system resource, while factor=1, for example, may indicate than an application is flexible to any change to system resources. The application tolerance assigns a value to system resource requirements other tolerance levels such as frequency range, memory bandwidth, range, cache size range, thermal design power (TDP) range, migration tolerance, Instructions per cycle (IPC) range, accelerator configuration, reserved fields. For example, a typical application tolerance may be:

Struct SLA_Template {Fmin, Fdesired, MemBWmin, MemBWdesired, CacheSizemin, CacheSizedesired, Xeon-generational IPCmin, MigrationTolerance, Xeon IPC requirement, Accelerator Config, ReservedFields, unified visual cloud representation,}

That can be mapped with the granularity of a scalable hierarchical representation of visual information.

An example usage of a scalable hierarchical representation may be as follows: an autonomous agent (e.g., a robot) may have one or more task including crossing a room to pick up an object. These one or more tasks may need high granular (e.g., surface and/or voxel) data for path planning and obstacle avoidance but will need finer granular data (point clouds) for grasping and manipulating the object. Further, the robot will need semantic information about the object shape, rigidity and points of contact to effectively execute the task. The proposed representation addresses these challenges through one representation system with ability to scale across granularities.

According to various aspects, a map representation system may include one or more processors configured to improved scalability, real-time performance, power efficiency, and/or an enablement of new usages.

Figure 4:
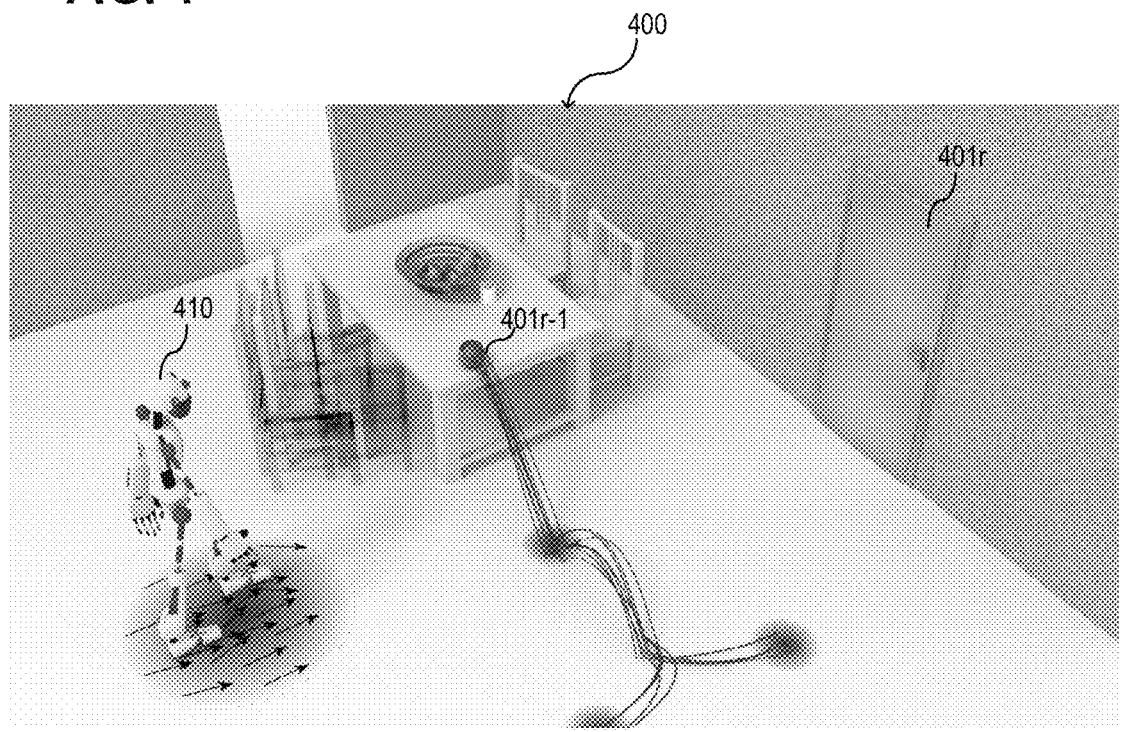
FIG. 4 shows a schematic scene of a robot operating in a room, according to some aspects.

FIG. 4 shows a scene 400 in which a robot 410 navigates a room to reach and open a door 401r. During this process, the process may include a plurality of tasks, the robot 410 may need access to the space structure information along with information about static and moving objects in the room. The granularity of the representation in this case may vary between the following:

1. Surface representation for path planning: The robot 410 (e.g., the planning system of the robot, also referred to as autonomous agent planning system) may need a high granular representation of the room walls and the objects for coarse grained path planning as the robot moves towards its goal, e.g., the door 401r.
2. Voxel representation of dynamic objects updated with time: The robot 410 e.g., the planning system of the robot) may need to perform obstacle avoidance in real time because of possible moving object (e.g., a falling apple 401r-1). The robot 410 (e.g., the planning system of the robot) may further need a physical anticipation to be able to predict whether a moving object will collide with it or not. To achieve the physical anticipation, the robot 410 (e.g., the planning system of the robot) may need a finer granular voxel representation that the robot 410 may use to make real-time decisions of path change, for example.
3. Point cloud representation: The robot 410 (e.g., the planning system of the robot) may need very fine point cloud information to be able to, for example, grasp the handle of the door 401r and turn it.
4. Semantic information: In addition to representing the space at various granularity levels, the robot 410 (e.g., the planning system of the robot) may also need to be able to associate semantic meaning to the objects and other entities in the space. For example, the robot 410 (e.g., the planning system of the robot) may need to be able to represent that the handle is grasped a certain way, it needs to be turned in a certain direction (e.g., clockwise or anticlockwise) and that the door 401r opens in a certain direction (e.g., inward or outward). Such semantic metadata may be integrally stored with the representation.

Figure 5A:
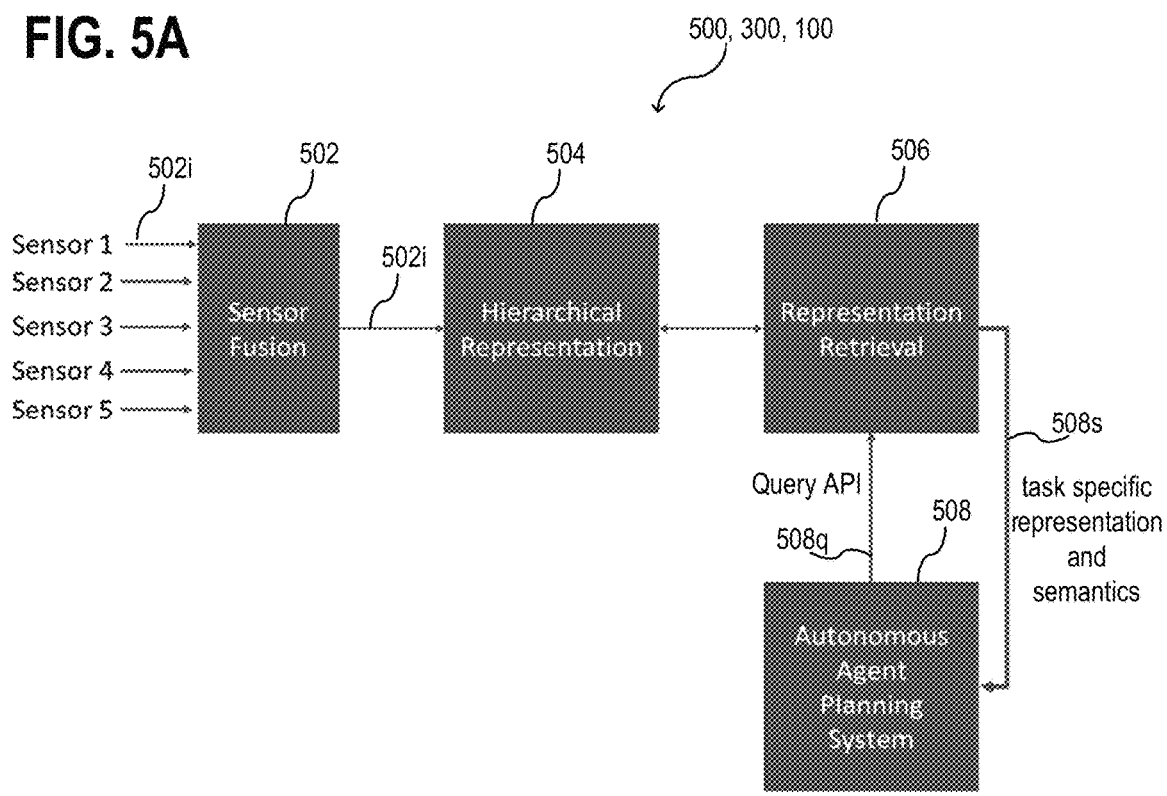
FIG. 5A and FIG. 5B show components of a map representation system in a schematic view, according to some aspects.

FIG. 5 shows one or more components of a map representation system 500, according to various aspects. The map representation system 500 may be configured in the same or in a similar way as described herein with reference to map representation system 100 or map representation system 300. Vice versa, the map representation system 100 or the map representation system 300 described herein may be configured in the same or in a similar way as the map representation system 500 shown in FIG. 5.

According to various aspects, the map representation system 500 may include a sensor fusion entity 502 (e.g., a sensor fusion module) configured to perceive space information 502i and feed the space information 502i to a representation subsystem 504. The representation subsystem 504 may include or may be a hierarchical representation subsystem.

According to various aspects, the representation subsystem 504 may maintain the representation in an efficient manner such that space information 502i in various granularities can be accessed, e.g., along with the associated semantic metadata.

According to various aspects, the map representation system 500 may include a representation retrieval subsystem 506. The representation retrieval subsystem 506 may determine the representation granularity needed for a certain task. The representation retrieval subsystem 506 may include one or more interfaces with the representation subsystem 504 to retrieve the suitable information.

According to various aspects, the map representation system 500 may include or may be associated with (e.g., communicatively coupled with) an autonomous agent planning system 508. The autonomous agent planning system 508 may be configured to make one or more queries 508q to the representation retrieval subsystem 506, e.g., through one or more published application programming interfaces. The one or more queries 508q (e.g., also referred to as requests) may contain task information and, e.g., optionally, a need for any semantic information. The representation retrieval subsystem 506 may be configure to retrieve task specific representation data and/or metadata from the representation subsystem 504 based on the task information and/or the semantic information (included in the one or more queries) and to provide 508s (e.g., send) the retrieved task specific representation data and/or metadata to the autonomous agent planning system 508.

In the following, various aspects of components of a map representation system (e.g., the map representation system 500) are described.

According to various aspects, the sensor fusion entity 502 may be or may include a sensor fused data ingress subsystem. This subsystem may implement sensor fusion capability to ingest data from multiple sensors and align the information based on space coordinates. The space coordinates may be part of or defined by a basic map. For example, a visual sensor subsystem included in or coupled to the map representation system may include or consist of one or more of the following sensors: a color sensor (e.g., a red-green-blue (RGB) sensor), a depth, a light detection and ranging (LiDAR) sensor, and/or radio detection and ranging (RADAR) sensor. All or groups of such's sensors may contribute to a single scene representation algorithm. The single scene representation algorithm may be configured to generate a plurality of representations of one or more objects with different granularities.

According to various aspects, the representation subsystem 504 may be or may include a (e.g., hierarchical) scene representation subsystem. The scene representation subsystem may be configured to organize space in a unified multi-granular hierarchical representation that allows an agent to query for information at a desired granularity based on a specific task (e.g. path planning vs. grasping).

According to various aspects, the representation subsystem 504 may be configure to provide a semantic metadata representation. The semantic metadata representation may allow for tagging on semantic metadata with each node in the representation. A node may include or may be a point in a point cloud, a voxel, and/or a surface dependent from the type or representation.

According to various aspects, the representation retrieval subsystem 506 may be configured to provide an intelligent data storage and data retrieval. The representation retrieval subsystem 506 may be configured to implement an application programming interface for storing new information as well as retrieve information in a performance and task specific manner from the (e.g., hierarchical) representation (and semantic) subsystem 504. Application programming interfaces for query response may efficiently process representation kernels based on context of the task. As an example: the representation retrieval subsystem 506 may be configured to provide fine granular representation for manipulation tasks and coarse granular information for navigation and/or collision avoidance tasks.

Figure 5B:
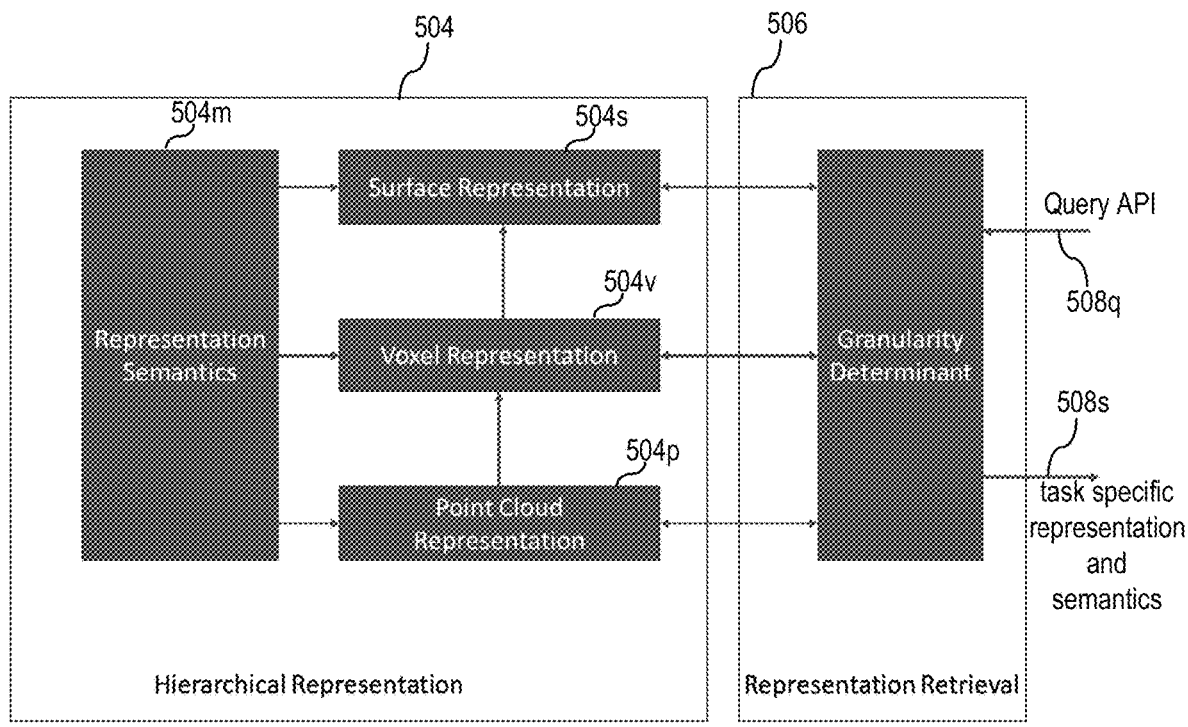

FIG. 5B shows internal functions and interfaces of the (e.g., hierarchical) representation (and semantic) subsystem 504 and the representation (and semantic) retrieval subsystem 506.

The representation subsystem 504 may be configured to obtain (e.g., receive from an external storage or load from an internal storage) various virtual representations of a space, e.g., of an operating space (see, for example, FIG. 1). The various virtual representations of a space may include a surface representation 504s, a voxel representation 504v, and a point cloud representation 504p, as examples. The various virtual representations of a space may differ at least in their respective granularity. It is noted that usually a surface representation 504s may have a higher granularity (e.g., a lower resolution) than a voxel representation 504v, and that a voxel representation 504v may have a higher granularity (e.g., a lower resolution) than a point cloud representation 504p. All of the various virtual representations of a space are associated with a single basic map, e.g., defining the coordinates. The basic map may include nodes or may have nodes assigned thereto for connecting metadata (e.g., representing semantic information) to one or more objects or space regions represented in the various virtual representations.

According to various aspects, a virtual object may be a virtual representation associated with one or more objects in the real space. A map representation system may represent a virtual object (in a virtual space) by center coordinates and boundaries associated with the center coordinates. A map representation system may represent a virtual object (in a virtual space) by a voxel or group of voxels. A map representation system may represent a virtual object (in a virtual space) by a point, a point cloud, or a group of points of a point cloud. A map representation system may represent a virtual object (in a virtual space) by a surface, e.g., defined by a surface normal vector and a position of the surface normal vector.

According to various aspects, a point cloud representation may have a resolution at least below one millimeter (e.g., a submillimeter resolution). According to various aspects, a voxel representation may have a resolution in the range from about one millimeter to about 1 centimeter or several centimeters (e.g., to about 2 cm, 3 cm, 4 cm, or 5 cm). According to various aspects, a surface representation may be a two-dimensional representation. A surface representation may have a resolution of more than about one centimeter or more than about several centimeters (e.g., more than about 2 cm, 3 cm, 4 cm, or 5 cm). However, the resolutions of the various virtual representations may be a function of the desired tasks and/or limited by the sensors that deliver the space information.

According to various aspects, the map representation system or the (e.g., hierarchical) representation (and semantic) subsystem 504 may be configured to convert a representation having a lower granularity associated therewith into a representation having a high granularity associated therewith. As an example, the map representation system may be configured to convert a point cloud representation 504p into a voxel representation 504v or into a surface representation 504s. As an example, the map representation system may be configured to convert a voxel representation 504v into a surface representation 504s.

According to various aspects, a basic maps (or a basic coordinate system) may define locations of objects represented in different types of representations. According to various aspects, each of the various virtual representations 504s, 504v, 504p may represent one or more objects in a same room (or, more generally, in a same operating space). According to various aspects, an autonomous agent (e.g., a robot) may include the map representation system. In other aspects, an autonomous agent (e.g., a robot) may be configured to communicate with the map representation system, e.g., based on a wired or wireless communication.

According to various aspects, the (e.g., hierarchical) representation (and semantic) subsystem 504 may be configured to provide semantic data 504m (e.g., representing semantic information) for the various virtual representations 504s, 504v, 504p. In some aspects, the semantic information may be locally defined (associated with coordinates in the virtual space) and/or object defined (associated to one or more virtual objects represented in the virtual space).

The representation (and semantic) retrieval subsystem 506 may be configured to determine a desired granularity for a representation based on the received query 508q. The representation (and semantic) retrieval subsystem 506 may be, for example, configured to select one of the various virtual representations 504s, 504v, 504p in accordance with a task represented by the received query 508q. The representation (and semantic) retrieval subsystem 506 may be, for example, configured to select, for one or more first objects to be represented, one of the various virtual representations 504s, 504v, 504p in accordance with a task represented by a received query 508q, and, for one or more second objects to be represented, another one of the various virtual representations 504s, 504v, 504p in accordance with the task represented by the received query 508q. The representation (and semantic) retrieval subsystem 506 may be, for example, configured to select, for one or more first regions of a space to be represented, one of the various virtual representations 504s, 504v, 504p in accordance with a task represented by a received query 508q, and, for one or more second regions of the space to be represented, another one of the various virtual representations 504s, 504v, 504p in accordance with the task represented by the received query 508q.

Figure 6:
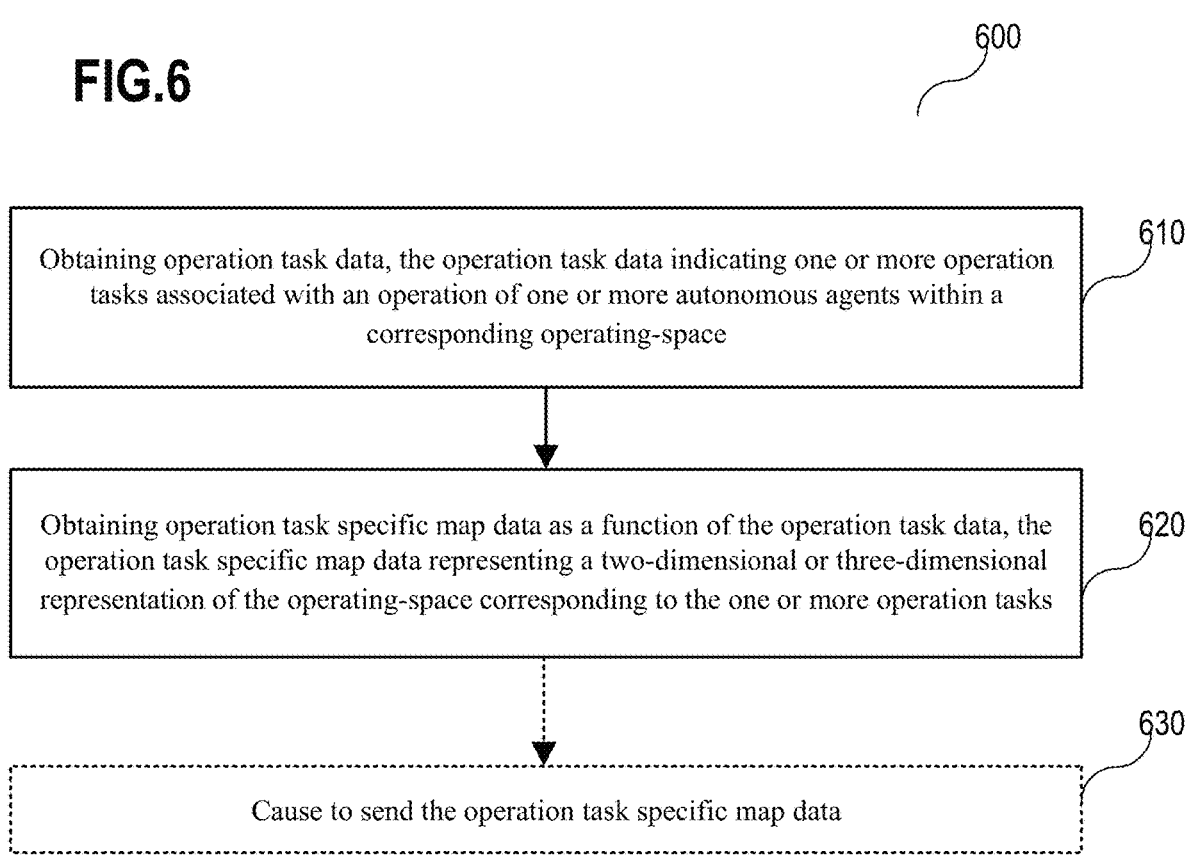
FIG. 6 shows exemplarily a flow diagram associated with operations of components that may be part of a map representation system in a schematic view, according to some aspects.

FIG. 6 shows a schematic flow diagram of a method 600 (e.g., a method for operating an autonomous agent), according to various aspects. The method may include, in 610, obtaining operation task data, the operation task data indicating one or more operation tasks associated with an operation of one or more autonomous agents within a corresponding operating space; and, in 620, obtaining operation task specific map data as a function of the operation task data, the operation task specific map data representing a two-dimensional or three-dimensional representation of the operating space corresponding to the one or more operation tasks. The method 600 may optionally further include cause to send the operation task specific map data.

According to various aspects, a means for operating an autonomous agent may include one or more processing means for: obtaining operation task data, the operation task data indicating one or more operation tasks associated with an operation of one or more autonomous agents within a corresponding operating space; and, obtaining operation task specific map data as a function of the operation task data, the operation task specific map data representing a two-dimensional or three-dimensional representation of the operating space corresponding to the one or more operation tasks In some aspects, the term "generate" is used herein with reference to a generation of data (e.g., map data, semantic data, sensor data, obtain operation task data, obtain operation task specific map data, as examples). The term generate may include or may be understood as one or more of the following terms: to create, to determine, to calculate, e.g., to determine and/or calculate based on one or more models, e.g., to determine and/or calculate based on one or more neural networks, e.g., to determine and/or calculate based on artificial intelligence (AI) implementations, as examples.

In some aspects, the term "obtain" is used herein with reference to obtaining data (e.g., map data, semantic data, sensor data, obtain operation task data, obtain operation task specific map data, as examples). The term obtain may include or may be understood as one or more of the following terms: to generate (e.g., to create, to determine, to calculate, e.g., to determine and/or calculate based on one or more models, e.g., to determine and/or calculate based on one or more neural networks, e.g., to determine and/or calculate based on artificial intelligence (AI) implementations, as examples), to receive (e.g., via one or more receivers), to load (e.g., from one or more memories), as examples.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" as, for example, used herein may be understood as any kind of entity (e.g., including hardware and/or software) that allows handling data. A processor may handle data according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, accelerator, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "one or more processors configured to" as, for example, used herein with reference to one or more functions may be understood as one of the one or more processors configured to implement the one or more functions. The term "one or more processors configured to" as, for example, used herein with reference to one or more functions may be also understood as two or more or all of the one or more processors configured to implement the one or more functions. The term "one or more processors configured to" as, for example, used herein with reference to a plurality of functions may be also understood as one of the one or more processors configured to implement a first function of the plurality of functions and another one of the one or more processors configured to implement a second function of the plurality of functions.

The terms "system" (e.g., a map representation system, an autonomous agent planning system, etc.) and "subsystem" (e.g., a representation retrieval subsystem, a representation subsystem, a sensor subsystem, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory" (and the like, e.g., storage) may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

Unless explicitly specified, the terms "transmit" and "send" may encompass both direct (point-to-point) and indirect transmission (via one or more intermediary points). Similarly, the term "receive" encompasses both direct and indirect reception. Furthermore, the terms "transmit," "receive," "send," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Various aspects herein may utilize one or more machine learning models to perform or control functions related to traffic control, traffic supervision, and the like. One or more machine learning models may be utilized, for example, to generate estimations of one or more traffic related characteristics based on input data (e.g., based on sensor data). The term "model" as, for example, used herein may be understood as any kind of algorithm, which provides output data from input data (e.g., any kind of algorithm generating or calculating output data from input data). A machine-learning model may be executed by a computing system to progressively improve performance of a specific task. In some aspects, parameters of a machine-learning model may be adjusted during a training phase based on training data. A trained machine-learning model may be used during an inference phase to make predictions or decisions based on input data. In some aspects, the trained machine-learning model may be used to generate additional training data. An additional machine-learning model may be adjusted during a second training phase based on the generated additional training data. A trained additional machine-learning model may be used during an inference phase to make predictions or decisions based on input data.

Various aspects are described herein with reference to an autonomous agent, e.g., a robot, an autonomous machine. However, other types of devices may be provided including the same or similar structures and functions as described exemplarily for the autonomous agent. Various aspects are described herein with reference to specific types of autonomous agents; however, other types of autonomous agent may be provided including the same or similar structures and/or functions as described exemplarily herein. A "machine" may be understood to include any type of mechanical structure that uses power to apply forces and control movement to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid robot, an agricultural machine, a machine tool, a moving machine, a stationary machine, a drone, an industrial robot, a medical operating robot, collectively programmed swarm robots, a ground machine, an aerial machine, or a mixture thereof, among others.

A "ground machine" or "ground robot" may be understood to include any type of machine, as described above, which is configured to traverse the ground, e.g., within a building, as part of a production line, on a street, on a road, on a track, off-road, etc. An "aerial machine" or "aerial robot" may be understood to include any type of machine, as described above, which is configured lift itself, e.g., to fly or hover.

The term "autonomous machine" (herein also referred to as robot) may describe a machine capable of performing one or more physical tasks (also referred to as task performance) without human input/control, e.g., plan the task performance, organize the task performance, schedule the task performance, switch from or to the task. The task performance may include to process one or more workpieces, e.g., by adding material to a workpiece, removing material from a workpiece, transforming a workpiece, navigating through a space, handling one or more objects, activating or deactivating one or more objects, only as examples. An autonomous machine (e.g., an autonomous agent planning system of an autonomous agent or an autonomous agent planning system communicatively coupled to an autonomous agent) may implement one or more task performance models, e.g., by a respective controller. A task performance model may be configured to control the task performance by the autonomous machine based on input data, e.g., to convert the input data into control instructions. The controller may be configured to exchange the control instructions within the autonomous machine, e.g., in accordance with a fieldbus communication protocol. Generally, a task performance model may be (e.g., at least in part) rule based and/or may be (e.g., at least in part) based on machine learning.

Examples of the input data may include information sensed by the autonomous machine, data stored by the autonomous machine (e.g., in a database), data indicating instructions provided to the autonomous machine (e.g., received by an operator or a group leader), data indicating an assignment of the autonomous machine to a group, data indicating an assignment of the autonomous machine to a task of the group, data received by the autonomous machine via a group message (e.g., from another autonomous machine of the group), and/or data detailing a mission (also referred to as mission data). The control instructions may be understood as in-machine instructions to control one or more actuators of the autonomous machine. Examples of the one or more actuators of the autonomous machine may include: one or more actuators configured to displace the autonomous machine, one or more configured to actuate a tool of the autonomous machine, one or more actuators configured to displace the tool (also referred to as effector) of the autonomous machine (e.g., relative to the one or more actuators configured to displace the autonomous machine), one or more actuators being part of the robotic arm of the autonomous machine.

For example, the task performance may be based on sensed information, e.g., sensed by one or more sensors of the autonomous machine or by one or more other sensors (e.g., of another autonomous machine). For example, task performance may be based on information about the environment of the autonomous machine, e.g., sensed by one or more sensors of the autonomous machine or by one or more other sensors (e.g., of another autonomous machine). For example, task performance may be based on a progress of performing the one or more task, e.g., sensed by one or more sensors of the autonomous machine or by one or more other sensors (e.g., of another autonomous machine). For example, task performance may include to navigate the machine according to one or more positions, at which one or more task are performed.

The task performance may include one or more operations of the autonomous machine, e.g., a spatial relation of the one or more operations (e.g., in a spatial sequence of operations) and/or a chronological relation of the one or more operations (e.g., in a chronologic sequence of operations). The spatial relation may reflect, where (i.e. with which spatial distribution) and/or with which direction the one or more operations is provided, i.e. in which corresponding spatial position (i.e. position and/or orientation) the autonomous machine or its tool is located.

One or more tasks may be represented (e.g., logically) by data (also referred to as mission data). A mission may refer to one task or a group of multiple tasks, which are related to each other, e.g., contextually related to each other. The mission data may be understood as a formal representation of the mission. Examples of the mission data may include: data identifying each task (also referred to as task identifier), data organizing each task (e.g., spatial and/or chronological data), data identifying the criteria under which a task is fulfilled, data identifying criteria for triggering, terminating, or maintaining a task. Furthermore, the mission data may include a mission logic, which logically combines several criteria and/or several tasks and/or which implements a sequence (e.g. a flow chart), according to which the mission is executed. For example, the mission logic may organize the mission hierarchically, e.g., into hierarchical levels, hierarchical groups, subtasks, and the like. For example, the mission logic may organize the mission based on conditional tasks, e.g., defining conditions/requirements to be fulfilled before starting a task performance. For example, a task may include multiple subtasks on a lower hierarchical level, which may be, but not need to be, prioritized, contextual based and/or conditional. Viewed at the hierarchical level of the subtask, the subtask may also be referred as task, and may include, but not need to include, multiple subtasks.

An autonomous machine may be configured to collaborate with one or more other autonomous machine, e.g., by implementing one or more collaboration protocols. Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task managing protocol). Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol.

A model (e.g., a machine-learning model) described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Various embodiments herein may utilize one or more machine learning models to perform or control functions of one or more apparatus associated with a map representation system (or other functions described herein). The term "model" may, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

In the following, various examples are described relating to aspects and figures described herein.

Example 1 is a map representation system including: one or more processors configured to: obtain operation task data, the operation task data indicating one or more operation tasks associated with an operation of one or more autonomous agents within a corresponding operating space; and obtain operation task specific map data as a function of the operation task data, the operation task specific map data representing a two-dimensional or three-dimensional representation of the operating space corresponding to the one or more operation tasks. Example 1 may be a map representation system including: one or more processors configured to: obtain operation task data, the operation task data indicating one or more operation tasks associated with an operation of one or more autonomous agents within a corresponding operating space; and obtain operation task specific map data, the operation task specific map data representing the operating space corresponding to the one or more operation tasks. Example 1 may be a map representation system including: one or more processors configured to: obtain operation task data, the operation task data indicating one or more operation tasks associated with an operation of one or more autonomous agents within a corresponding operating space; and obtain operation task specific map data, the operation task specific map data representing one or more characteristics of the operating space corresponding to the one or more operation tasks. One or more characteristics of the operating space may include a behavior of one or more objects disposed in the operating space and/or one or more properties of one or more objects disposed in the operating space. A property of an object may include a texture property, a material property, a temperature, a roughness, an illumination, and/or another physical and/or chemical property. One or more characteristics of the operating space may include one or more properties of the operating space itself. A property of the operating space may include a temperature, an illumination, and/or another physical and/or chemical property.

In Example 2, the map representation system of Example 1 may optionally include that the one or more processors are further configured to cause to send the operation task specific map data. In some aspects, the map representation system of Example 1 may optionally include that the one or more processors are further configured to cause to send the operation task specific map data to an autonomous agent planning system (e.g., to an autonomous agent planning system of an autonomous agent or to an autonomous agent planning system communicatively coupled to an autonomous agent).

In Example 3, the map representation system of Example 1 or 2 may optionally further include: one or more memories; and map data stored in the one or more memories, the map data representing a set of distinct two-dimensional or three-dimensional representations of the operating space. In some aspects, the map representation system of Example 1 or 2 may optionally further include: one or more memories; and hierarchical representation data stored in the one or more memories, the hierarchical representation data representing a set of distinct two-dimensional or three-dimensional representations of the operating space.

In Example 4, the map representation system of Example 3 may optionally further include: semantic data stored in the one or more memories and associated with the map data, the semantic data representing semantic information associated with the operating space, e.g., associated with one or more objects located in the operating space.

In Example 5, the map representation system of any one of Examples 1 to 4 may optionally include that the one or more processors are further configured to obtain operation task specific semantic data, the operation task specific semantic data representing semantic information associated with one or more objects in the operating space corresponding to the one or more operation tasks.

In Example 6, the map representation system of Example 5 may optionally include that the one or more processors are further configured to cause to send the operation task specific semantic data. In some aspects, the map representation system of Example 1 may optionally include that the one or more processors are further configured to cause to send the operation task specific semantic data to an autonomous agent planning system (e.g., to an autonomous agent planning system of an autonomous agent or to an autonomous agent planning system communicatively coupled to an autonomous agent).

In Example 7, the map representation system of any one of Examples 4 to 6 may optionally include that the semantic information include at least one of the following information: information related to a material of one or more objects in the operating space; information related to a morphology of one or more objects in the operating space; information related to a color of one or more objects in the operating space; information related to a surface property of one or more objects in the operating space; information related to a movement function of one or more objects in the operating space; information related to an activation and/or deactivation function of one or more objects in the operating space; information related to a deformation function of one or more objects in the operating space.

In Example 8, the map representation system of any one of Examples 1 to 7 may optionally include that the one or more processors are configured to obtain the operation task data by receiving the operation task data, e.g., from an autonomous agent planning system.

In Example 9, the map representation system of Example 8 may optionally include that the one or more processors are configured to cause to send the operation task specific map data to the autonomous agent planning system.

In Example 10, the map representation system of any one of Examples 1 to 9 may optionally include that the one or more processors are configured to obtain the operation task specific map data by selecting, in accordance with the one or more operation tasks, the two-dimensional or three-dimensional representation of the operating space from a set of distinct two-dimensional or three-dimensional representations of the operating space.

In Example 11, the map representation system of any one of Examples 1 to 10 may optionally include that the one or more processors are configured to obtain the operation task specific map data by selecting, in accordance with the one or more operation tasks, a first two-dimensional or three-dimensional representation of a first portion of the operating space from a set of distinct two-dimensional or three-dimensional representations of the operating space and a second two-dimensional or three-dimensional representation of a second portion of the operating space from a set of distinct two-dimensional or three-dimensional representations of the operating space, the first two-dimensional or three-dimensional representation and the second two-dimensional or three-dimensional representation providing the two-dimensional or three-dimensional representation of the operating space corresponding to the one or more operation tasks.

In Example 12, the map representation system of any one of Examples 1 to 11 may optionally include that the one or more processors are configured to obtain the operation task specific map data by selecting, in accordance with the one or more operation tasks, a first two-dimensional or three-dimensional representation of a first object in the operating space from a set of distinct two-dimensional or three-dimensional representations of the operating space and a second two-dimensional or three-dimensional representation of a second object in the operating space from a set of distinct two-dimensional or three-dimensional representations of the operating space, the first two-dimensional or three-dimensional representation and the second two-dimensional or three-dimensional representation providing the two-dimensional or three-dimensional representation of the operating space corresponding to the one or more operation tasks.

In Example 13, the map representation system of any one of Examples 10 to 12 may optionally include that the set of distinct two-dimensional or three-dimensional representations of the operating space includes a plurality of two-dimensional or three-dimensional representations with distinct granularities.

In Example 14, the map representation system of any one of Examples 10 to 13 may optionally include that the set of distinct two-dimensional or three-dimensional representations of the operating space includes one or more two-dimensional or three-dimensional representations of one or more objects in the operating space. In some aspects, one or more two-dimensional or three-dimensional representations of one or more objects in the operating space may be referred to as virtual objects.

In Example 15, the map representation system of any one of Examples 10 to 14 may optionally include that the set of distinct two-dimensional or three-dimensional representations of the operating space includes at least two of the following two-dimensional or three-dimensional representations: a two-dimensional or three-dimensional point-cloud representation, a two-dimensional or three-dimensional voxel representation, and a two-dimensional surface representation.

In Example 16, the map representation system of any one of Examples 10 to 15 may optionally include that the set of distinct two-dimensional or three-dimensional representations of the operating space have a basic map associated therewith, the basic map represent a coordinate system of a virtual space in accordance with the operating space. In some aspects, each two-dimensional or three-dimensional representation of the set of distinct two-dimensional or three-dimensional representations may be a different type of representation based on the same basic map.

In Example 17, the map representation system of any one of Examples 1 to 16 may optionally include that the two-dimensional or three-dimensional representation of the operating space corresponding to the one or more operation tasks includes at least one of the following two-dimensional or three-dimensional representations: a two-dimensional or three-dimensional point-cloud representation, a two-dimensional or three-dimensional voxel representation, and a two-dimensional surface representation.

In Example 18, the map representation system of any one of Examples 1 to 17 may optionally include that the two-dimensional or three-dimensional representation of the operating space corresponding to the one or more operation tasks includes one or more two-dimensional or three-dimensional representations of one or more objects in the operating space.

In Example 19, the map representation system of any one of Examples 1 to 18 may optionally include that the two-dimensional or three-dimensional representation of the operating space corresponding to the one or more operation tasks includes: a first two-dimensional or three-dimensional representation of one or more first objects in the operating space, and a second two-dimensional or three-dimensional representation of one or more second objects in the operating space, wherein the first two-dimensional or three-dimensional representation has a different granularity compared to the second two-dimensional or three-dimensional representation.

In Example 20, the map representation system of any one of Examples 1 to 19 may optionally include that the two-dimensional or three-dimensional representation of the operating space corresponding to the one or more operation tasks includes: a first two-dimensional or three-dimensional representation of one or more first portions of the operating space, and a second two-dimensional or three-dimensional representation of one or more second portions of the operating space, wherein the first two-dimensional or three-dimensional representation has a different granularity compared to the second two-dimensional or three-dimensional representation.

In Example 21, the map representation system of any one of Examples 1 to 20 may optionally include that the operation task includes at least one of the following operation tasks: a navigation task, an obstacle avoidance task, wherein the obstacle an object in the operating space, an interaction task related to an interaction with one or more objects in the operating space. An interaction of an interaction task may include grasping, activating, deactivating, modifying, removing, adding, moving, deforming, as examples.

In Example 22, the map representation system of any one of Examples 1 to 21 may optionally include that the operation task data further indicating a demand for semantic information associated with the operation of the one or more autonomous agents within the operating space.

Example 23 is a representation system including: one or more processors configured to receive operation task data (e.g., from an autonomous agent planning system), the operation task data indicating an operation task associated with an operation of one or more autonomous agents in an operating space; obtain task specific representation data, the task specific representation data representing a task-specific two-dimensional or three-dimensional representation of the operating space corresponding to the operation task indicated by the operation task data; and cause to send the task specific representation data (e.g., to the autonomous agent planning system).

Example 24 is a representation system including: one or more processors configured to receive operation task data from an autonomous agent planning system, the operation task data indicating an autonomous agent operation task associated with an operation of one or more autonomous agents in an operating space; obtain task specific representation data, the task specific representation data representing a task-specific representation of the operating space, the task-specific representation corresponding to the autonomous agent operation task indicated by the operation task data (granularity determinant); obtain task-specific semantic data, the task-specific semantic data representing semantic information associated with one or more objects in the operating space; and cause to send the task specific representation data and the task-specific semantic data to the autonomous agent planning system.

Example 25 is a map representation system (e.g., a hierarchical representation system) including: one or more memories; map representation data stored in the one or more memories, the map representation data representing a set of distinct representations associated with a basic map representing an operating space for operations of one or more autonomous agents, semantic data stored in the one or more memories and associated with the map representation data, the semantic data representing semantic information associated with one or more objects located in the operating space.

Example 31 is a map representation system or a map representation system including: one or more processors configured to: obtain map data, the map data representing a virtual space of a real space and one or more first virtual representations of one or more first objects disposed within the real space and one or more second virtual representations of one or more second objects disposed within the real space, wherein the one or more first virtual representations are of a first type of representations and wherein the one or more second virtual representations are of a second type of virtual representations different from the first type of virtual representations. In some aspects, the map may represent a virtual space in a basic coordinate system.

In Example 32, the map representation system or the map representation system of Example 31 may optionally further include that the one or more processors are further configured to: obtain sensor data representing information associated with the real space and the one or more first objects and the one or more first objects disposed therein.

In Example 33, the map representation system or the map representation system of Example 32 may optionally further include that the one or more processors are further configured to: obtain the map data by generating the map data based on the sensor data.

In Example 34, the map representation system or the map representation system of Example 32 or 32 may optionally further include that the sensor data represent sensor fusion information provided by a plurality of sensors. According to various aspects, the map representation system may include a sensor fusion entity configured to generate senor data representing the sensor fusion information.

In Example 35, the map representation system or the map representation system of any one of Examples 31 to 34 may optionally further include that the first type of virtual representations and the second type of virtual representations differ from one another with respect to the granularity.

In Example 36, the map representation system or the map representation system of any one of Examples 31 to 35 may optionally further include that the first type of virtual representations is one of a point cloud representation, a voxel representation, and a surface representation; and wherein the second type of virtual representations is another one of a point cloud representation, a voxel representation, and a surface representation.

In Example 37, the map representation system or the map representation system of any one of Examples 31 to 36 may optionally further include that the map data further representing one or more third virtual representations of one or more third objects disposed within the real space. The one or more third virtual representations may be of a third type of virtual representations different from the first type of virtual representations and different from the second type of virtual representations.

In Example 38, the map representation system or the map representation system of any one of Examples 31 to 37 may optionally further include that the first type of virtual representations and the second type of virtual representations differ from one another with respect to the granularity. The first type of virtual representations and the third type of virtual representations may differ from one another with respect to the granularity. The second type of virtual representations and the third type of virtual representations may differ from one another with respect to the granularity.

In Example 39, the map representation system or the map representation system of any one of Examples 31 to 38 may optionally further include that the first type of virtual representations is one of a point cloud representation, a voxel representation, and a surface representation; that the second type of virtual representations is another one of a point cloud representation, a voxel representation, and a surface representation.

In Example 40, the map representation system or the map representation system of Example 39 may optionally further include that the third type of virtual representations is still another one of a point cloud representation, a voxel representation, and a surface representation.

Example 41 is an autonomous agent including a map representation system of any one of the preceding examples. The autonomous agent may further include an autonomous agent planning system. The autonomous agent may further include one or more sensors. The autonomous agent may further include a sensor fusion entity to provide space information to the map representation system.

Various functions and/or processes may be described herein, e.g., with reference to a map representation system, one or more autonomous agents, and one or more entities thereof. It is noted that various combinations of one or more functions and/or one or more processes may be implemented in one or more processors; in some cases independently of the location of the one or more processors within the overall map representation system. Illustratively, one or more processors (e.g., of a map representation system) may be configured to implement any single function or combination of functions described herein and/or any single process or combination of processes described herein.

According to various aspects, any method or part of a method described herein may be partially or completely implemented as a non-transitory computer readable medium with program instructions, which when executed, cause one or more processors to perform at least a portion or all of the method.

According to various aspects, any function or combination of functions described with reference the examples above may be partially or completely implemented as a method, in some aspects independently of the apparatus that is described to implement the respective function or combination of functions.

According to various aspects, any function or combination of functions described with reference the examples above may be partially or completely implemented by one or more means, in some aspects independently of the apparatus that is described to implement the respective function or combination of functions.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A map representation system comprising:
one or more processors configured to:
obtain operation task data, the operation task data indicating one or more operation tasks associated with an operation of one or more autonomous agents within an operating space; and
select map data of the operating space from a plurality of maps of the operating space based on the one or more operation tasks;
wherein each of the plurality of maps depicts a portion of the operating space with a different level of granularity;
wherein the operation tasks are tasks performed by a robot.

2. The map representation system of claim 1,
wherein the one or more processors are further configured to cause to send the selected map data.

3. The map representation system of claim 1,
wherein the one or more processors are configured to obtain the operation task data by receiving the operation task data from an autonomous agent planning system, and
wherein the one or more processors are configured to cause to send the selected map data to the autonomous agent planning system.

4. The map representation system of claim 1,
wherein the one or more processors are configured to obtain the operation task specific map data by selecting, in accordance with the one or more operation tasks, a first representation of a first portion of the operating space from a set of distinct representations of the operating space and a second representation of a second portion of the operating space from a set of distinct representations of the operating space, the first representation and the second representation providing the representation of the operating space corresponding to the one or more operation tasks.

5. The map representation system of claim 1,
wherein the one or more processors are configured to select map data by selecting, in accordance with the one or more operation tasks, a first representation of a first object in the operating space from a set of distinct representations of the operating space and a second representation of a second object in the operating space from a set of distinct representations of the operating space, the first representation and the second representation providing the representation of the operating space corresponding to the one or more operation tasks.

6. The map representation system of claim 1,
wherein a representation of the operating space corresponding to the one or more operation tasks comprises at least one of the following representations:
a two-dimensional or three-dimensional point-cloud representation, a two-dimensional or three-dimensional voxel representation, or
a two-dimensional surface representation.

7. The map representation system of claim 1,
wherein a representation of the operating space corresponding to the one or more operation tasks comprises one or more representations of one or more objects in the operating space.

8. The map representation system of claim 1,
wherein a representation of the operating space corresponding to the one or more operation tasks comprises:
a first representation of one or more first objects in the operating space, and
a second representation of one or more second objects in the operating space,
wherein the first representation has a different granularity compared to the second representation; and/or
a first representation of one or more first portions of the operating space, and
a second representation of one or more second portions of the operating space,
wherein the first representation has a different granularity compared to the second representation.

9. The map representation system of claim 1,
wherein the operation task data further indicate a tolerance factor, the tolerance factor representing a specific service level agreement associated with a representation of the operating space.

10. The map representation system of claim 1, wherein the selecting map data of the operating space from the plurality of maps of the operating space based on the one or more operation tasks comprises selecting the map data of the operating space from either a plurality of two-dimensional maps or from a plurality of three-dimensional maps.

11. The map representation system of claim 1, further comprising:
one or more memories; and
map data stored in the one or more memories, wherein the maps represent a set of distinct representations of the operating space.

12. The map representation system of claim 11, further comprising:
semantic data stored in the one or more memories and associated with the map data, the semantic data representing semantic information associated with one or more objects located in the operating space.

13. The map representation system of claim 12,
wherein the semantic information comprise at least one of the following information:
information related to a material of one or more objects in the operating space;
information related to a morphology of one or more objects in the operating space;
information related to a color of one or more objects in the operating space;
information related to a surface property of one or more objects in the operating space;
information related to a movement function of one or more objects in the operating space;
information related to an activation and/or deactivation function of one or more objects in the operating space; and/or
information related to a deformation function of one or more objects in the operating space.

14. The map representation system of claim 1,
wherein the one or more processors are further configured to obtain operation task specific semantic data, the operation task specific semantic data representing semantic information associated with one or more objects in the operating space corresponding to the one or more operation tasks.

15. The map representation system of claim 14,
wherein the one or more processors are further configured to cause to send the operation task specific semantic data.

16. The map representation system of claim 1,
wherein the one or more processors are configured to obtain the operation task specific map data by selecting, in accordance with the one or more operation tasks, a representation of the operating space from a set of distinct representations of the operating space.

17. The map representation system of claim 16,
wherein the set of distinct representations of the operating space have a basic map associated therewith, wherein the basic map represents a coordinate system of a virtual space in accordance with the operating space and each representation of the set of distinct representations is a representation of the basic map.

18. The map representation system of claim 16,
wherein the set of distinct representations of the operating space comprises a plurality of representations with distinct granularities.

19. The map representation system of claim 18,
wherein the set of distinct representations of the operating space comprises at least two of the following representations:
a two-dimensional or three-dimensional point-cloud representation,
a two-dimensional or three-dimensional voxel representation, or
a two-dimensional surface representation.

20. A representation system comprising:
one or more processors configured to
receive operation task data from an autonomous agent planning system, the operation task data indicating an autonomous agent operation task associated with an operation of one or more autonomous agents in an operating space;
select map data of the operating space from a plurality of maps of the operating space based on the one or more operation tasks;
obtain task-specific semantic data, the task-specific semantic data representing semantic information associated with one or more objects in the operating space; and
cause to send the selected map data and the task-specific semantic data to the autonomous agent planning system;
wherein each of the plurality of maps depicts a portion of the operating space with a different level of granularity;
wherein the operation tasks are tasks performed by a robot.

21. A non-transitory computer readable medium with program instructions, which when executed, cause one or more processors to:
obtain operation task data, the operation task data indicating one or more operation tasks associated with an operation of one or more autonomous agents within an operating space; and
select map data of the operating space from a plurality of maps of the operating space based on the one or more operation tasks; and
wherein each of the plurality of maps depicts a portion of the operating space with a different level of granularity;

wherein the operation tasks are tasks performed by a robot.

22. The non-transitory computer readable medium of claim 21,
wherein the operation task specific map data represent at least one of the following representations:
a two-dimensional representation of the operating space, and/or
a three-dimensional representation of the operating space, and/or
a presentation of one or more characteristics of the operating space.

\* \* \* \* \*